United States Patent
Liu (10) Patent No.: US 9,104,953 B2
(45) Date of Patent: Aug. 11, 2015

(54) RFID TAG ANTENNA WITH COMPENSATION STRUCTURE, RFID TAG AND RFID SYSTEM

(75) Inventor: Zhijia Liu, Shanghai (CN)

(73) Assignee: SHANGHAI YAOCHUAN INFORMATION TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 14/123,682

(22) PCT Filed: Jun. 8, 2012

(86) PCT No.: PCT/CN2012/076633
§ 371 (c)(1),
(2), (4) Date: Apr. 16, 2014

(87) PCT Pub. No.: WO2012/167740
PCT Pub. Date: Dec. 13, 2012

(65) Prior Publication Data
US 2014/0091150 A1    Apr. 3, 2014

(30) Foreign Application Priority Data
Jun. 8, 2011  (CN) .......................... 2011 1 0151940

(51) Int. Cl.
*G06K 7/08* (2006.01)
*G06K 19/06* (2006.01)
(Continued)

(52) U.S. Cl.
CPC .... *G06K 19/07771* (2013.01); *G06K 19/07786* (2013.01); *H01Q 1/2208* (2013.01); *H01Q 1/2225* (2013.01); *H01Q 9/0407* (2013.01); *H01Q 9/0421* (2013.01)

(58) Field of Classification Search
USPC .......................................... 235/451, 492, 488
See application file for complete search history.

(56) References Cited

U.S. PATENT DOCUMENTS

| 7,501,955 B2 * | 3/2009 | Forster et al. ............... 340/572.7 |
| 2006/0043198 A1 * | 3/2006 | Forster .......................... 235/492 |

(Continued)

FOREIGN PATENT DOCUMENTS

| CN | 101378145 A | 3/2009 |
| CN | 101533946 A | 9/2009 |

(Continued)

OTHER PUBLICATIONS

English Translation of International Search Report from PCT/CN2012/076633; dated Sep. 20, 2012.

*Primary Examiner* — Tuyen K Vo
(74) *Attorney, Agent, or Firm* — Baker & Hostetler LLP (57) ABSTRACT

The invention claims a Radio Frequency Identification (RFID) tag antenna with a compensation structure, an RFID tag and an RFID system. The RFID tag antenna comprises: a dielectric substrate (3); a conductor grounding part (2) which is arranged in the way of covering the whole surface of one main surface of the dielectric substrate (3); a conductor radiation part (4) which is arranged in the way of covering the whole surface of the other main surface of the dielectric substrate (3); a feeding part (5) which is arranged on one end face in the length direction of the dielectric substrate (3) and provided with a first feed line (51) and a second feed line (52), wherein the first feed line (51) and the second feed line (52) are respectively electrically connected with the conductor grounding part (2) and the conductor radiation part (4); and a conductor compensation part (7) which is arranged on at least one of the two side faces in parallel with the length direction of the dielectric substrate (3), wherein the conductor grounding part (2) and the conductor radiation part (4) are electrically connected through the conductor compensation part (7).

14 Claims, 4 Drawing Sheets (51) Int. Cl.
*G06K 19/077* (2006.01)
*H01Q 1/22* (2006.01)
*H01Q 9/04* (2006.01)

(56) References Cited

U.S. PATENT DOCUMENTS

2006/0054710 A1* 3/2006 Forster et al. ............ 235/492
2006/0055542 A1* 3/2006 Forster et al. ............ 340/572.7
2007/0080233 A1* 4/2007 Forster et al. ............ 235/492
2007/0216534 A1* 9/2007 Ferguson et al. ......... 340/572.7
2008/0315992 A1* 12/2008 Forster ..................... 340/10.1
2009/0015480 A1* 1/2009 Shafer et al. ............. 343/700 MS
2011/0025471 A1* 2/2011 Popugaev et al. ......... 340/10.3
2013/0049933 A1* 2/2013 Baym et al. .............. 340/10.1

FOREIGN PATENT DOCUMENTS

CN 201741805 U 2/2011
CN 202205887 U 4/2012

* cited by examiner

RFID TAG ANTENNA WITH COMPENSATION STRUCTURE, RFID TAG AND RFID SYSTEM

CROSS-REFERENCE TO RELATED APPLICATIONS

This application is a National Stage of International Patent Application No. PCT/CN2012/076633, filed Jun. 8, 2012 and claims priority to foreign application CN 201110151940.7, filed Jun. 8, 2011, the content of which are incorporated herein by reference in their entirety.

TECHNICAL FIELD

The present invention relates to an RFID tag antenna, an RFID tag and an RFID system, specifically to the RFID tag antenna, the RFID tag and the RFID system that can be put close to metallic object to carry out wireless communication.

BACKGROUND ART

Recently, for high efficient logistics management and commodity management, the Radio Frequency Identification (RFID) system is popularly applied globally. The RFID system comprises RFID tag having chips, and the reader or reader-writer that can carry out wireless communication with the RFID.

The RFID tag in the RFID system is required to be small as well as reliable in working performance and sufficiently long communication distance. However, the RFID tag is mounted on various objects for use, thus the antenna performance and communication distance are changed because of the influence from the objects on which it is mounted. Especially, when it is mounted on the object with metal surface, the reliability of working performance becomes worse, and the communication distance decreases obviously.

Figure 10:
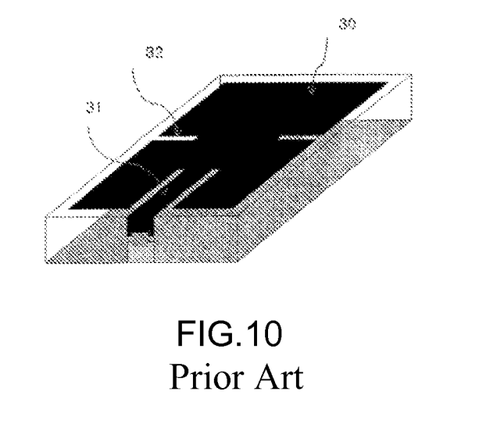
FIG. 10 is the schematic diagram of the RFID tag in prior art.

In order to keep the performance of antenna and guarantee stable recognition rate at every position even if the RFID tag is mounted on the metal surface, the invention of the patent document 1 discloses a miniature RFID tag of micro-strip antenna with ground as metal. FIG. 10 illustrates the RFID tag. As illustrated in FIG. 10, the micro-strip patch antenna of the RFID tag includes a power supply part 31 and a radiation part 30 that are mutually connected, and two sides of the radiation part 30 are provided with at least one notch 32.

In consideration of the related technologies of micro-strip antenna, the effective radiating area of the micro-strip antenna has big influence to the transmission gain, and directly influences the communication distance and bandwidth of the communication frequency of RFID tag. If other parameters of the micro-strip antenna are the same, when the effective radiating area becomes bigger, the communication distance of the RFID tag becomes longer and the bandwidth of the communication frequency can also be improved.

However, in prior art, for the micro-strip antenna that works normally, it is necessary to reserve space on the main surface where the radiation surface is mounted to form an impedance match network of the micro-strip antenna and a structure that is used to adjust resonance frequency of the micro-strip antenna. For example, the invention of the patent document 1. Several notches are formed on the radiating part, so as to form the impedance match network and the structure that is used to adjust resonance frequency. Therefore, the effective radiating area of the radiation part in the invention of the patent document 1 is reduced. This shows that considering from improving effective radiating area to improve performance of the micro-strip antenna, there is still a lot to improve the invention of patent document 1.

Patent document 1: CN101728647A

SUMMARY OF THE INVENTION

The present invention is to solve the above problem, aiming to provide an RFID tag antenna with a compensation structure, an RFID tag and an RFID system. Without need of changing tag size and material of every part, the above RFID tag antenna, the RFID tag and the RFID system have longer communication distance and improved bandwidth performance.

To achieve the above object, the present invention provides an RFID tag antenna with a compensation structure, comprising: a dielectric substrate, and the shape thereof is a laminated cuboid; a conductor grounding part which is arranged in the way of covering the whole surface of one main surface of the dielectric substrate; a conductor radiation part which is arranged in the way of covering the whole surface of the other main surface of the dielectric substrate; a feeding part which is arranged on one end face in the length direction of the dielectric substrate and provided with a first feed line and a second feed line, wherein the first feed line and the second feed line are respectively electrically connected with the conductor grounding part and the conductor radiation part; and a conductor compensation part which is arranged on at least one of the two side faces in parallel with the length direction of the dielectric substrate, wherein the conductor grounding part and the conductor radiation part are electrically connected through the conductor compensation part.

In the RFID tag antenna of the present invention, the feeding part and the conductor composition part function as the impedance match network and the structure used to adjust resonance frequency of the RFID tag antenna, and the feeding part and the conductor composition part are located on the head face of the RFID tag antenna, so the conductor radiation part and the conductor grounding part are respectively covered on the whole surface of the two main surfaces of the dielectric substrate, thus to improve the communication distance and bandwidth performance without changing tag size and material of any part.

In the RFID tag antenna with a compensation structure of the present invention, wherein the end part of the conductor compensation part adjacent to the feeding part is at the position corresponding to resonance frequency of the antenna.

In the above RFID tag antenna, the electrical length of the RFID tag antenna is adjusted to expected length by changing the position of head part of the conductor compensation part close to the feeding part, so as to realize expected resonance frequency of the RFID tag antenna.

In the RFID tag antenna with a compensation structure of the present invention, preferably, the conductor compensation parts are arranged respectively on the two side faces in parallel with the length direction of the dielectric substrate. Moreover, preferably, the two conductor compensation parts are symmetrical with each other and of same conductive material. "The two conductor compensation parts are symmetrical with each other" means that positions of the two conductor compensation parts on the two side faces are symmetrical and of same shape, namely, the two conductor compensation parts are symmetrical with each other with respect to the plane that has same distance to the two side faces and is in parallel with the two side faces.

In the RFID tag antenna, by using two symmetrical conductor compensation parts, current distribution on the conductor grounding part and the conductor radiation part of the RFID tag antenna is more uniform, and the communication distance and bandwidth frequency are further improved.

In the RFID tag antenna with a compensation structure of the present invention, preferably, the conductor compensation parts are in the shape of longitudinal symmetry. Further, preferably, the first feed line is longitudinally symmetrical with the second feed line.

In the RFID tag antenna, the conductor grounding part is longitudinally symmetrical with the conductor radiation part, and the conductor compensation parts are in the shape of longitudinal symmetry, and the first feed line is longitudinally symmetrical with the second feed line; namely, the whole RFID tag antenna is in the shape of longitudinal symmetry. Therefore, when every part of the RFID tag antenna is of same material, it is unnecessary to distinguish forward and reverse of the RFID tag antenna in production and actual use, which is helpful for improving production efficiency and convenient to use.

In the RFID tag antenna with a compensation structure of the present invention, preferably, the first feed line is longitudinally symmetrical with the second feed line; and the first feed line and the second feed line respectively have the shape of horizontal symmetry with respect to a center line of the side face of the feeding part. Further, the first feed line and the second feed line respectively have a width corresponding to resonance frequency of the antenna in the width direction of the dielectric substrate.

In the RFID tag antenna with a compensation structure of the present invention, preferably, the distance 1 from the end part of the conductor compensation part adjacent of the feeding part to the end part of the side face of the conductor compensation part away from the feeding part meets the formula $1 < H + L/2$, wherein H is the height of the dielectric substrate, and L is the length of the dielectric substrate. In the RFID tag antenna of the present invention, by using the conductor compensation parts arranged on the side faces of the dielectric substrate, the electrical length loss caused by reduced tag antenna size can be compensated, so as to further realize miniaturization of RFID tag. Especially, when the distance 1 from the end part of the conductor compensation part adjacent of the feeding part to the end part of the side face of the conductor compensation part away from the feeding part meets the formula $1 < H + L/2$ (wherein H is the height of the dielectric substrate, and L is the length of the dielectric substrate), the electrical length compensation using the conductor compensation parts is more effective.

The feeding part of the present invention is arranged on one of the two side faces of the dielectric substrate in parallel with the length direction, and the conductor compensation part is arranged on at least one end face of the dielectric substrate in the length direction.

In the RFID tag antenna with a compensation structure of the present invention, preferably, the conductor compensation part and the feeding part are arranged on the same side face or same end face.

In the RFID tag antenna with a compensation structure of the present invention, preferably, the conductor compensation part is at least one metal strip.

In the RFID tag antenna with a compensation structure of the present invention, preferably, width of the conductor compensation part is less than 1 cm.

In the RFID tag antenna, by changing width of the first feed line and the second feed line, the electrical length of the RFID tag antenna can be adjusted as required, so as to realize expected resonance frequency of the RFID tag antenna.

In the RFID tag antenna with a compensation structure of the present invention, preferably, the conductor grounding part, the conductor radiation part, the first feed line, the second feed line and the conductor compensation parts are made by curing high-conductivity powder.

To achieve the above object, the present invention further provides an RFID tag, comprising: the said RFID tag antenna with a compensation structure; chips which are respectively electrically connected with the first feed line and the second feed line; wherein the conductor compensation part has such a width that the impedance of the RFID tag antenna matches with that of the chip.

To achieve the above object, the present invention further provides an RFID system, comprising the said RFID tag, and the reader or reader-writer that can carry out wireless communication with the RFID.

According to the above structure, by adopting the present invention, without changing the tag size and material of any part, the RFID tag antenna, RFID tag and RFID system can improve communication distance and bandwidth performance. Namely, if the communication distance and bandwidth performance are not changed, the miniaturization of RFID tag and antenna can be further realized.

DETAILED DESCRIPTION OF THE PREFERRED EMBODIMENTS

The following is description of the embodiments of the present invention in combination of the drawings.

<RFID System and RFID Tag Structure>

Figure 1:
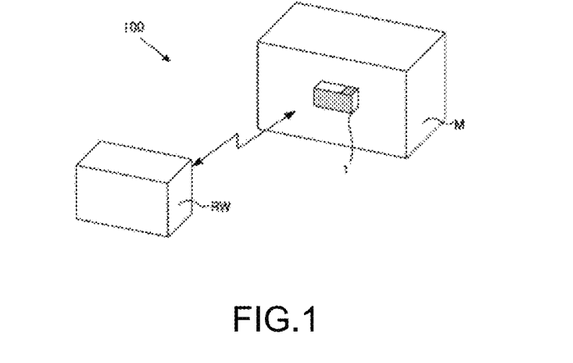
FIG. 1 is the schematic diagram of the RFID system of the present invention.
Figure 2:
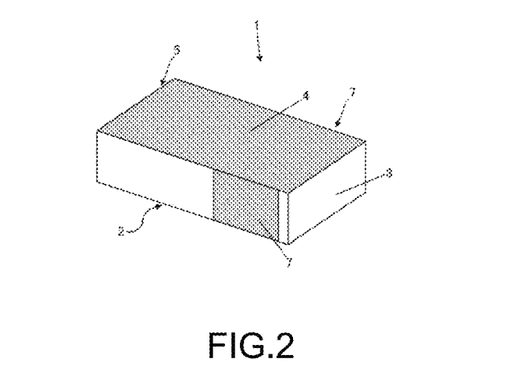
FIG. 2 is the space diagram of the RFID tag of the present invention.

FIG. 1 is the schematic diagram of the RFID system of the present invention, and FIG. 2 is the space diagram of the RFID tag of the present invention.

Firstly, FIG. 1 illustrates structure of the RFID system 100 of the present invention. The RFID system 100 comprises RFID tag 1, which is mounted on metallic objects M like steel products, moulds and manufacturing equipment; reader-writer RW, which carries out non-contact information reading and writing with the RFID tag 1. For example, the RFID tag 1 is mounted on the steel products that are difficult to be identified to the naked eyes like stainless steel sheet, during out-put and in-put of warehouse, and checking processes, the RFID system 100 carries out picking, checking of products through portable reader-writer RW; or when the RFID tag 1 is mounted on the mould or manufacturing equipment and used for checking or confirmation, RFID system 100 can be used for management.

In addition, in the RFID system 100 of the present invention, the reader-writer RW is the portable or fixed type reader-writer RW, and the reader-writer RW can also be a reader.

The following is description of structure of the RFID tag 1 in combination with FIG. 2.

As shown in FIG. 2, the RFID tag 1 comprises a conductor grounding part 2, a dielectric substrate 3, a conductor radiation part 4, a feeding part 5, a chip 6 and conductor compensation parts 7.

Figure 3:
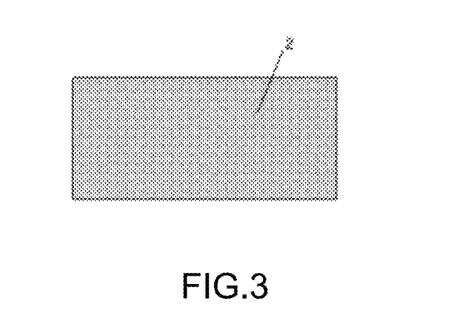
FIG. 3 is the bottom view of the RFID tag of the present invention.

FIG. 3 is the bottom view of the RFID tag 1 of the present invention.

As shown in FIG. 3 the conductor grounding part 2 is arranged on one main surface of the dielectric substrate 3 and covered on this whole surface.

The said dielectric substrate 3 is made of ceramic dielectric, or synthetic resin materials like FR4, polytetrafluoroethylene, polyethylene, polyethylene terephthalate (PET), polypropylene and polyimide, and the shape thereof is a laminated cuboid. In the present invention, material of the dielectric substrate 3 is preferably ceramic dielectric.

Figure 4:
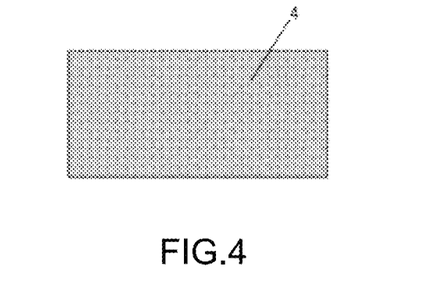
FIG. 4 is the top view of the RFID tag of the present invention.

FIG. 4 is the top view of the RFID tag of the present invention.

As shown in FIG. 4, the conductor radiation part 4 is arranged on the other main surface of the dielectric substrate 3 and covered on this whole surface.

Figure 5:
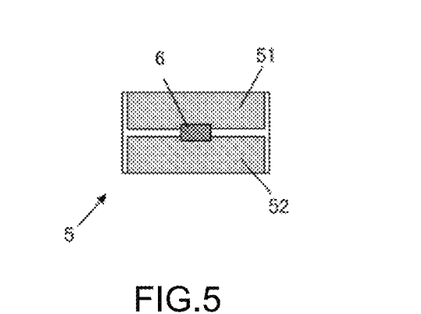
FIG. 5 is the left view of the RFID tag of the present invention.

FIG. 5 is the left view of the RFID tag of the present invention.

As shown in FIG. 2 and FIG. 5, the feeding part 5 is arranged on one end face of the dielectric substrate 3 in the length direction, and is provided with a first feed line 51 and a second feed line 52, wherein the first feed line 51 and the second feed line 52 are respectively electrically connected with the conductor grounding part 2 and the conductor radiation part 4. The first feed line 51 and the second feed line 52 preferably adopt the structure of longitudinal symmetry. Further, the first feed line 51 and the second feed line 52 respectively have the shape of horizontal symmetry with respect to a center line of the end face of the dielectric substrate on which the feeding part 5 is located.

As shown in FIG. 5, the chip 6 is respectively connected electrically with the first feed line 51 and the second feed line 52.

As shown in FIG. 2, the conductor compensation part 7 is arranged on at least one of the two side faces in parallel with the length direction of the dielectric substrate 3, wherein the conductor grounding part 2 and the conductor radiation part 4 are electrically connected through the conductor compensation part 7. In the present invention, preferably one conductor compensation part is respectively arranged on the two side faces in parallel with the length direction of the dielectric substrate, and the two conductor compensation parts 7 are symmetrical with each other. The conductor compensation parts 7 are in the shaped of arc, strip-shaped rectangle and triangle, preferably, the longitudinally symmetrical structure like strip-shaped rectangle is used.

The conductor grounding part 2, the conductor radiation part 4, the feeding part 5 and the conductor compensation part 7 of the said RFID tag 1 are made of conductive materials, such as copper, aluminum, stainless steel or silver. In the present invention, the conductor grounding part 2, the conductor radiation part 4, the feeding part 5 and the conductor compensation part 7 are preferably made by curing high conductivity powder like silver. In the structure of the RFID tag 1, the conductor grounding part 2, the dielectric substrate 3, the conductor radiation part 4, the feeding part 5 and the conductor compensation part 7 are identical to RFID tag antenna of the present invention.

<Compensation Action of the Conductor Compensation Part to Electrical Length of the RFID Tag Antenna>

Figure 6:
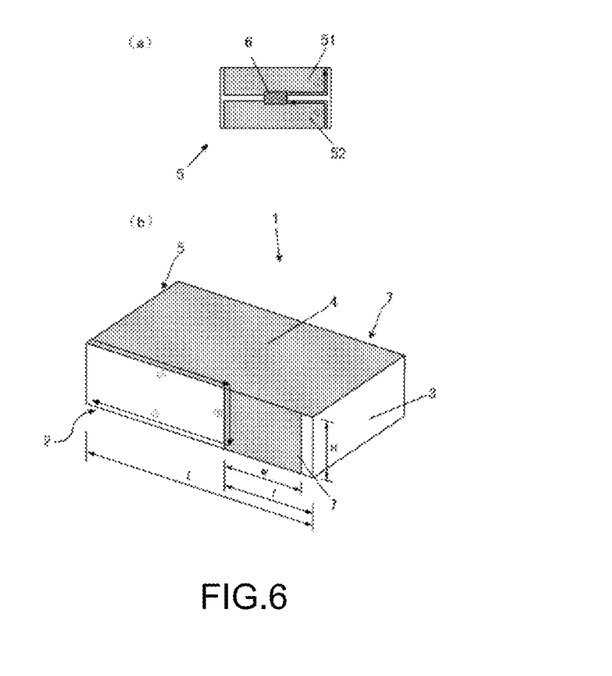
FIG. 6 is the schematic diagram of the electrical length of the RFID tag antenna of the present invention.
Figure 7:
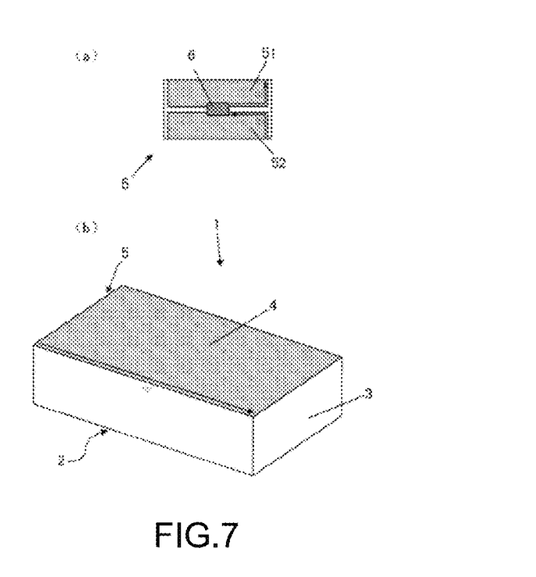
FIG. 7 is the schematic diagram of the electrical length of the RFID tag antenna without conductor compensation part of the present invention.

The following is description of compensation action of the conductor compensation part 7 to electrical length of the RFID tag antenna referring to FIG. 6 and FIG. 7. FIG. 6 is the schematic diagram of the electrical length of the RFID tag antenna of the present invention. FIG. 7 is the schematic diagram of the electrical length of the RFID tag antenna without conductor compensation part 7 of the present invention.

As shown in (*a*) and (*b*) of FIG. 6, the electrical length of the RFID tag antenna of the present invention is approximately the sum of length of arrows ①, ②, ③, ④, and ⑤ marked.

As shown in (*a*) and (*b*) of FIG. 7, the electrical length of the RFID tag antenna without conductor compensation part of the present invention is approximately the sum of length of arrows (1), (2) and (3) marked.

When parameters of the feeding part 5 in (*a*) of FIG. 6 and the feeding part 5 in (*a*) of FIG. 7 like shape are changed, the sum of length of arrows ① and ② marked is obviously longer than that of the arrows (1) and (2) marked. Because length of arrow ④ marked is the height H of the dielectric substrate 3, and length of the arrow (3) marked is the length L of the dielectric substrate 3, when sum of length of arrows ④ and ⑤ marked is greater than length of arrow (3) marked, that is, when the distance l from the end part of the conductor compensation part 7 adjacent of the feeding part 5 to the end part of the side face of the conductor compensation part 7 away from the feeding part 5 meets the formula l<H+L/2, the electrical length of the RFID tag antenna of the present invention obtains effective compensation through the conductor compensation part 7. Therefore, by using the RFID tag antenna that is smaller than prior art, communication within the UHF (860 Mhz~960 Mhz) frequency band can be realized.

It is not difficult to find that, in FIG. 6 and FIG. 7, if the end part of the conductor compensation part 7 away from the feeding part 5 is overlapped with the end part of the side face where the conductor compensation part is located away from the feeding part, width w of the conductor compensation part 7 becomes w=l; at this time, when the width w of the conductor compensation part 7 meets the formula w<H+L/2, the electrical length of the RFID tag antenna of the present invention obtains effective compensation through the conductor compensation part 7. The above example is only a typical example to describe the compensation action of the position and width of the conductor compensation part 7 to the electrical length of the RFID tag antenna; however, the calculation method of the compensation action of the position and width of the conductor compensation part 7 to the electrical length of the RFID tag antenna is not limited by the above method. The technician of this field could make any modification on the basis of the technical proposal as disclosed in the present invention, according to the compensation principle of the electrical length of the RFID tag antenna as described above, the position and width w of the conductor compensation part 7 can be set for RFID tag antenna of specified resonance frequency. Positions of the conductor compensation part 7 and the feeding part 5 are also not limited by the above embodiment. The technician of this field could make proper change on the basis of the above embodiment. The conductor compensation part of the present invention can also be arranged on at least one end face of the dielectric substrate in the length direction, and the feeding part 5 can also be arranged on one side face of the dielectric substrate in the length direction.

Figure 8:
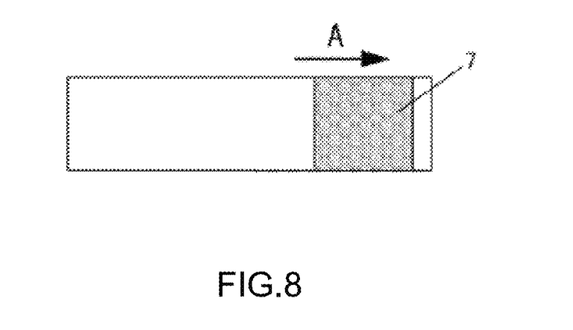
FIG. 8 is the schematic diagram to demonstrate relationship between width of the conductor compensation part and the electrical length of the RFID tag antenna of the present invention.

FIG. 8 is the schematic diagram to demonstrate relationship between width of the conductor compensation part 7 and the electrical length of the RFID tag antenna of the present invention.

When width of the conductor compensation part 7 is reduced along the arrow A direction in FIG. 8, as shown in (a) and (b) of FIG. 6, the electrical length of the RFID tag antenna denoted by sum of length of arrows ①, ②, ③, ④, and ⑤ marked increases, such that the resonance frequency of the RFID tag antenna can be decreased. When width of the conductor compensation part 7 is increased opposite to the arrow A direction, the resonance frequency of the RFID tag antenna can be increased.

In addition, in condition that the width of the conductor compensation part 7 is not changed, the end part of the conductor compensation part 7 close to the feeding part 5 can be moved through horizontal movement of the whole conductor compensation part 7, such that the electrical length of the RFID tag antenna can also be changed, thus to change the resonance frequency of the RFID tag antenna.

<Compensation Action of the Feeding Part to Electrical Length of the RFID Tag Antenna>

Figure 9:
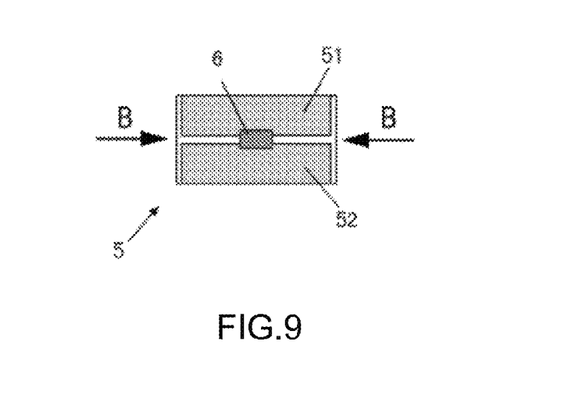
FIG. 9 is the schematic diagram to demonstrate relationship between width of the feeding part and the electrical length of the RFID tag antenna of the present invention.

The following is description of compensation action of the feeding part 5 to electrical length of the RFID tag antenna referring to FIG. 6 and FIG. 9.

FIG. 9 is the schematic diagram to demonstrate relationship between width of the feeding part and the electrical length of the RFID tag antenna of the present invention.

When width of the first feed line 51 and the second feed line 52 of the feeding part 5 in the width direction of the dielectric substrate 3 is reduced along the arrow B direction in FIG. 9, as shown in (a) of FIG. 6, the local electrical length of the RFID tag antenna denoted by sum of length of arrows ① and ② decreases, such that the resonance frequency of the RFID tag antenna can be increased. When width of the first feed line 51 and the second feed line 52 of the feeding part 5 is increased opposite to the arrow B direction, the resonance frequency of the RFID tag antenna can be decreased.

<Impedance Match Action of the Conductor Compensation Part to the RFID Tag Antenna>

In order to make the chip obtain maximum power from the RFID tag antenna, it is necessary to realize impedance match of the two. When the chip used by the RFID tag is determined, it is necessary to adjust input impedance of the RFID tag antenna to realize impedance match of the chip and the RFID tag antenna.

The inventor finds that impedance match of the chip and the RFID tag antenna can be realized by changing width of the conductor compensation part 7 of the RFID tag antenna of the present invention.

Other Modified Embodiments of the Present Invention

Figure 11:
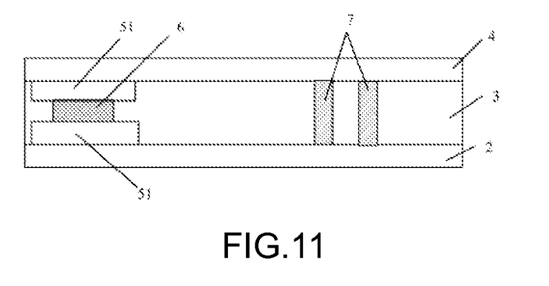
FIG. 11 is the schematic diagram of a side face of a modified embodiment of the present invention.

It is important to note that the above embodiments are only the preferred ways to describe structure of the conductor compensation part 7 of the present invention. However, the conductor compensation part 7 is not limited to be arranged to at least one of the two side faces in parallel with the dielectric substrate 3 in the length direction, it can also be arranged on any side face of the dielectric substrate 3; or it can be arranged to the same end face with the feeding part 5; at this time, the feeding part 5 and the conductor compensation part 7 respectively occupy part of the end face but are not overlapped or electrically connected. The first feed line 51 and the second feed line 52 can cover one end face of the dielectric substrate 3 in the length direction, or can be part of the end face, so as to realize the technical proposal of forming the feeding part 5 and the conductor compensation part 7 on the same end face of the dielectric substrate 3 of the present invention, as shown in FIG. 11.

The conductor compensation part 7 in the modified embodiments is arranged on side face of the dielectric substrate 3 or inside the dielectric substrate 3. Of course, the conductor compensation part 7 can be arranged on any side face of the dielectric substrate 3. As further improvement to the modified embodiment, there can be multiple conductor compensation parts 7, and the conductor compensation parts 7 can be arranged on one side face of the dielectric substrate 3, or respectively on the side faces of different medium substrates 11. The conductor compensation parts 7 can also be manufactured inside the dielectric substrate 3 with special technique. Preferably, in the embodiment, the conductor compensation parts 7 are arranged on a same side face.

As a better implementation way of the modified embodiment, the conductor compensation part 7 can be metal strip, the width is preferably less than 1 cm; moreover, the first feed line 51, the second feed line 52 and the conductor compensation part 7 are arranged on the same side face. Thus it is convenient for installation, and it is very suitable for the operation personnel to install and maintain. Besides, according to the experience, when width of the conductive metal strip is less than 1 cm, it also has conduction effect and better electrical performance. Moreover, when width of the conductor compensation part 7 is less than 1 cm, it is more beneficial for layout of arranging the first feed line, the second feed line and the conductive metal strips at the same side face; besides, the number of the conductive metal strips can be selected according to actual requirement, so as to realize different electrical length compensation effect of the RFID tag antenna.

Similarly, the former embodiments and the electrical calculation formulae as shown in FIG. 6 and FIG. 7 are also suitable for the modified embodiment of the present invention.

<Performance Comparison of the RFID Tag of the Present Invention with the RFID Tag of Prior Art>

The inventor has made the RFID tag for test with the above structure, and carried out performance comparison of the RFID tag of the present invention with the RFID tag of prior art as disclosed in patent document 1 (applicant of the patent document 1 is actually the applicant of the present invention).

The RFID tag for test has the shape as shown in FIG. 2 to FIG. 5, with the parameters as follows:

Dielectric substrate: material thereof is ceramic dielectric, with a size of 12 mm×7 mm×3 mm (length×width×height);

The first feed line and the second feed line: both are in the shape of strip-shaped rectangle, with same size, covering approximately the whole end face of the dielectric substrate;

Conductor compensation part: two conductor compensation parts are used, with width of 4 mm; the end part of the conductor compensation part 7 away from the feeding part 5 is overlapped with the end part of the end face where the conductor compensation part is located away from the feeding part, namely, w=1;

Chip: manufactured by American Alien Company, model: H3;

Others: the conductor grounding part, the conductor radiation part, the feeding part and the conductor compensation part are made by curing sliver powder.

The RFID tag as disclosed in patent document 1 is used as comparison object of the performance comparison, with each part having same size with the RFID tag for test.

The content of performance comparison includes communication distance and working frequency bandwidth of the RFID tag.

In the communication distance test of the RFID tag, the Tagformance Lite system manufactured by the Voyantic Company is used. The test result shows that the communication distance of the RFID tag of the present invention is 2.7 meters, while the communication distance of the RFID tag of the comparison object is 2.1 meters. The communication distance of the RFID tag of the present invention is obviously improved.

In the working frequency bandwidth test of the RFID tag, the Tagformance Lite system manufactured by the Voyantic Company is used to test the working frequency bandwidth when the reading-writing distance is more than 2 meters. The test result shows that the working frequency bandwidth of the RFID tag of the present invention is 905 Mhz~935 Mhz, namely 30 Mhz, while the working frequency bandwidth of the RFID tag of the comparison object is 917 Mhz~923 Mhz, namely 6 Mhz. The working frequency bandwidth of the RFID tag of the present invention is obviously improved.

The embodiments disclosed in the present invention are only examples but not limitation to the present invention. The scope of the present invention is not limited by the above content, but specified by the scope of the claims, including technical proposals identical to the technical features as in the claims and all modification within the scope of the claims.

The invention claimed is:

1. An RFID tag antenna with a compensation structure, comprising:
   a dielectric substrate, and the shape thereof is a laminated cuboid;
   a conductor grounding part which is arranged in the way of covering the whole surface of one main surface of the dielectric substrate;
   a conductor radiation part which is arranged in the way of covering the whole surface of the other main surface of the dielectric substrate;
   a feeding part which is arranged on one end face in the length direction of the dielectric substrate and provided with a first feed line and a second feed line, wherein the first feed line and the second feed line are respectively electrically connected with the conductor grounding part and the conductor radiation part;
   and a conductor compensation part which is arranged on at least one of the two side faces in parallel with the length direction of the dielectric substrate, wherein the conductor grounding part and the conductor radiation part are electrically connected through the conductor compensation part.

2. The RFID tag antenna with a compensation structure according to claim 1, wherein the end part of the conductor compensation part adjacent to the feeding part is at the position corresponding to resonance frequency of the antenna.

3. The RFID tag antenna with a compensation structure according to claim 1, wherein the conductor compensation parts are arranged on the two side faces in parallel with the length direction of the dielectric substrate.

4. The RFID tag antenna with a compensation structure according to claim 3, wherein the two conductor compensation parts are symmetrical with each other and of same conductive material.

5. The RFID tag antenna with a compensation structure according to claim 1, wherein the conductor compensation parts are in the shape of longitudinal symmetry.

6. The RFID tag antenna with a compensation structure according to claim 1, wherein the first feed line is longitudinally symmetrical with the second feed line; and the first feed line and the second feed line respectively have the shape of horizontal symmetry with respect to a center line of the side face of the feeding part.

7. The RFID tag antenna with a compensation structure according to claim 1, wherein the first feed line and the second feed line respectively have a width corresponding to resonance frequency of the antenna in the width direction of the dielectric substrate.

8. The RFID tag antenna with a compensation structure according to claim 7, wherein the distance 1 from the end part of the conductor compensation part adjacent of the feeding part to the end part of the side face of the conductor compensation part away from the feeding part meets the formula $1<H+L/2$, wherein H is the height of the dielectric substrate, and L is the length of the dielectric substrate.

9. The RFID tag antenna with a compensation structure according to claim 1, wherein the feeding part is arranged on one of the two side faces of the dielectric substrate in parallel with the length direction, and the conductor compensation part is arranged on at least one end face of the dielectric substrate in the length direction.

10. The RFID tag antenna with a compensation structure according to claim 1, wherein the conductor compensation part and the feeding part are arranged on the same side face or same end face.

11. The RFID tag antenna with a compensation structure according to claim 10, wherein the conductor compensation part is at least one metal strip.

12. The RFID tag antenna with a compensation structure according to claim 11, wherein width of the conductor compensation part is less than 1 cm.

13. An RFID tag, comprising:
   the RFID tag antenna with a compensation structure according to claim 1;
   chips which are respectively electrically connected with the first feed line and the second feed line;
   the conductor compensation part has such a width that the impedance of the RFID tag antenna matches with that of the chip.

14. An RFID system, comprising the RFID tag according to claim 13, and the reader or reader-writer that can carry out wireless communication with the said RFID.

* * * * *